United States Patent
He et al.

(10) Patent No.: US 6,489,372 B1
(45) Date of Patent: *Dec. 3, 2002

(54) POLYCARBONATE ISOLATION THROUGH HOMOGENIZATION DEVOLATIZATION

(75) Inventors: Qiwei He, Niskayuna, NY (US); Paul Russell Wilson, Latham, NY (US); Paul William Buckley, Scotia, NY (US); Allen Wai Yee Ko, Evansville (IN); Larry Allen Divins, Terre Haute (IN); William Lee Gately, Burnt Hills, NY (US); Ganesh Kailasam, Murcia (ES)

(73) Assignee: General Electric Company, Niskayuna, NY (US)

( * ) Notice: Subject to any disclaimer, the term of this patent is extended or adjusted under 35 U.S.C. 154(b) by 14 days.

This patent is subject to a terminal disclaimer.

(21) Appl. No.: 09/690,596

(22) Filed: Oct. 17, 2000

Related U.S. Application Data (63) Continuation-in-part of application No. 09/470,735, filed on Dec. 23, 1999, now Pat. No. 6,214,892.

(51) Int. Cl.⁷ .............................. C08J 11/04; C08J 6/00
(52) U.S. Cl. .................... 521/40; 521/40.5; 521/42; 521/42.5; 521/43; 521/44.5; 521/45.5; 521/47; 521/48; 523/346; 523/347; 528/501; 528/502
(58) Field of Search .......................... 521/40, 48, 40.5, 521/42, 42.5, 43, 44.5, 45.5, 47; 523/346, 347; 528/501, 502

(56) References Cited

U.S. PATENT DOCUMENTS

| 3,954,713 A | 5/1976 | Schnoring et al. |
| 4,452,976 A | 6/1984 | Kohyama et al. |
| 4,546,172 A | 10/1985 | Kohyama et al. |
| 5,583,166 A | 12/1996 | Okamoto et al. ............ 523/340 |
| 5,663,277 A | 9/1997 | Isshiki et al. ................ 528/196 |

FOREIGN PATENT DOCUMENTS

| EP | 499072 A1 | 8/1992 |
| GB | 1039547 | 8/1966 |

Primary Examiner—Morton Foelak
(74) Attorney, Agent, or Firm—Andrew J. Caruso; Noreen C. Johnson (57) ABSTRACT

Polymer are removed from organic solvent-polymer mixtures by preparing a liquid-liquid dispersion of finely dispersed solvent droplets containing polymer in water, adding this liquid-liquid dispersion to a stirred vessel containing water or other suitable liquid and rapidly evaporating the solvent to produce a slurry of the polymer in a liquid from which the solid polymer particles are recovered.

16 Claims, 1 Drawing Sheet

FIG. 1

POLYCARBONATE ISOLATION THROUGH HOMOGENIZATION DEVOLATIZATION

RELATED APPLICATION

This application is a continuation-in-part of U.S. application No. 09/470,735, filed Dec. 23, 1999, now U.S. Pat. No. 6,124,892 which is incorporated herein by reference.

FIELD OF THE INVENTION

This invention relates to a method for recovering polymer resins from solution. More particularly, it relates to a process for isolating a polymer resin from a liquid-liquid dispersion that is formed by admixing an aqueous fluid with an organic solvent that contains the dissolved polymer.

BACKGROUND OF THE INVENTION

Several methods are currently used to recover polymer resins from solution. Some of the methods are energy intensive and require large quantities of steam to accomplish removal of the solvent. Other methods require high viscosity process equipment which require a high investment cost. Further, the residual solvent contained in the product powder or particles is difficult to remove.

U.S. Pat. No. 4,546,172 discloses the production of polycarbonate resin particles having high bulk density that are produced by a process in which a polymer solution, or polymer solution-water mixture are fed into an agitation tank containing water the temperature of which is higher than the boiling point of the solvent methylene chloride. The methylene chloride evaporates and the polycarbonate is recovered in the form of an aqueous slurry. This process has the disadvantage that the polycarbonate often agglomerates, producing a large sticky mass prior to precipitation, leading to difficulties in processing. In the process described above, an off-tank wet pulverizer is used to grind the large sticky mass of polycarbonate produced upon evaporation of the methylene chloride.

In another polymer isolation scheme the polymer solution is added to a non-solvent resulting in the precipitation of the polymer. The polymer is then collected. This technique necessitates the use of large quantities of the non-solvent and ultimately the separation of the non-solvent solvent mixture. Moreover, a portion of the product polymer may be soluble in the non-solvent solvent mixture occasioning loss of product.

The utilization of high viscosity process equipment is another solution to the problem of agglomeration.

It would be desirable to develop a process for the recovery of polymers in solution which avoids the use of high shear agitation in the solvent removal step and large quantities of non-solvent, and minimizes energy consumption and the use of special equipment. The present invention overcomes these limitations on the recovery of polymers from organic mixtures.

BRIEF SUMMARY OF THE INVENTION

In one aspect the invention relates to a method of recovering polymer from an organic mixture comprising polymer and an organic solvent, the method comprising:
 a) admixing an aqueous fluid and the organic mixture by application of a combined mechanical and hydraulic shear force, the combined mechanical and hydraulic shear force being sufficient to form a liquid-liquid dispersion;
 b) removing the organic solvent from the liquid-liquid dispersion thereby forming an aqueous slurry of polymer particles; and
 c) separating the polymer from the aqueous slurry.

DESCRIPTION OF THE INVENTION

The present invention may be understood more readily by reference to the following description of preferred embodiments of the invention and the Examples included therein. In this specification and in the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein, the term "polycarbonate" includes homopolycarbonates such as BPA polycarbonate, copolycarbonates derived from two or more different dihydric phenols, and copolyestercarbonates which include structural units derived from one or more dihydric phenols and 1 or more diacid derived structural units. Thus, Lexan SP® which contains about 8.6% by weight structural units derived from dodecandioic acid in addition to bisphenol A derived structural units, is considered to be a polycarbonate which is also a copolyestercarbonate. Between the terms "polycarbonate" and "copolyestercarbonate" the former is defined to be the broader term which includes the latter as a class of polycarbonates.

As used herein, the term "interfacial polycarbonate" refers to a polycarbonate made by the interfacial reaction of a dihydric phenol and a carbonate precursor such as phosgene or a bisphenol bischloroformate. Further the term "interfacial polycarbonate" refers to polycarbonate made by the interfacial hydrolysis polymerization reaction of monomeric or oligomeric bisphenol bischloroformates which occurs upon exposure of a solution of the bischloroformate to a base such as aqueous as sodium hydroxide and a phase transfer catalyst such as triethylamine. The term furthers includes copolyestercarbonates prepared by the interfacial reaction of a dihydric phenol, a diacid or diacid chloride, and a carbonate precursor such as phosgene.

As used herein the term "aqueous liquid" refers to a fluid which is primarily water or is made up entirely of water. A water-methanol mixture which contains more than 50 percent by weight water is an example of an aqueous liquid which is primarily water. A mixture of water containing 10% by weight of a surfactant is likewise an example of an aqueous liquid which is primarily water.

As used herein the term "boiling point" refers to the boiling point of a liquid at a particular pressure and not simply a liquid's boiling point at atmospheric pressure. In the examples given the boiling points of solvents and water will vary depending upon the pressure. For example, in step (b) of the invention in which solvent removal is effected by evaporation, the boiling point of the solvent may be controlled by varying the pressure at which the solvent removal is conducted. Reference made to the boiling points of solvent, such as methylene chloride, and water, refer to the boiling points of solvent and water at the pressure at which solvent removal is carried out.

"BPA" is herein defined as bisphenol A or 2,2-bis(4-hydroxyphenyl)propane.

"m,p-BPA" is herein defined as 2-(4-hydroxyphenyl)-2-(3-hydroxyphenyl)propane.

The terms "diphenol" and "dihydric phenol" as used herein are synonymous.

The term "polymer resin" as used herein, includes, but is not limited to oligomers, graft polymers, block copolymers, terpolymers, branched polymers, thermoplastics and mixtures thereof. Suitable thermoplastics for treatment in the instant process include, but are not limited to, polycarbonates, polystyrene, olefin polymers, polyethylene ethers, polyphenylene ethers, polyetherimides, polyethersulfones, polyamides and polyesters.

The term "rotor stator shear mixer" as used herein, includes, single and multiple stage rotor stator shear mixers.

In one embodiment of the present invention, polycarbonates are isolated from a solution comprising the polycarbonate and an organic solvent, the polycarbonate produced in an interfacial process, where the organic solvent acts as the reaction medium during the interfacial process.

Polycarbonates which may be isolated by the method of this invention typically comprise structural units of the formula

III wherein at least about 60% of the total number of R groups are aromatic organic radicals and the balance thereof are aliphatic, alicyclic or aromatic radicals. Preferably, each R is an aromatic organic radical and more preferably a radical of the formula

IV wherein each $A_1$ and $A_2$ is a is a monocyclic divalent aryl radical and Y is a bridging radical in which one or two carbonate atoms separate $A_1$ and $A_2$. Such radicals may be derived from dihydroxyaromatic compounds of the formulas HO—R—OH and HO—$A_1$—Y—$A_2$—OH, or their corresponding chloroformate derivatives. $A_1$ and $A_2$ include but are not limited to unsubstituted phenylene, preferably p-phenylene or substituted derivatives thereof. The bridging radical Y is most often a hydrocarbon group and preferably a saturated group, such as methylene, cyclohexylidene or isopropylidene. Isopropylidene is the more preferred. Thus, the more preferred polycarbonates are those comprising residues of 2,2-bis(4-hydroxyphenyl)propane, also known as "bisphenol A". In one embodiment, the polycarbonate is a homopolymer of bisphenol A.

Copolyestercarbonates may also be isolated by the method of this invention. Examples of copolyestercarbonates isolable by the method of the instant invention include Lexan SP®, a copolymer prepared by the interfacial polymerization of bisphenol A, dodecandioic acid and phosgene. Lexan SP® has a glass transition temperature of 125° C. The method of the present invention is applicable to a wide variety of copolyestercarbonates such as those described in U.S. Pat. 4,983,706 which is herein incorporated by reference. The polyestercarbonate may comprise residues of aliphatic or aromatic diacids. The corresponding derivatives of aliphatic or aromatic diacids, such as the corresponding acid chlorides, may also be utilized in the interfacial polymerization process.

Suitable organic solvents for use in the interfacial process for polycarbonate synthesis include any organic solvent which is substantially insoluble in water and inert to the process conditions. Where polycarbonates are concerned, the organic solvent should not react with the carbonyl halide or the caustic used in the interfacial preparation of the polycarbonate. Suitable organic solvents include, but are not limited to, aliphatic hydrocarbons such as pentane, hexane, cyclohexane, and heptane; aromatic hydrocarbons such as toluene, xylene; substituted aromatic hydrocarbons, such as chlorobenzene, dichlorobenzene, and nitrobenzene; chlorinated aliphatic hydrocarbons such as chloroform and methylene chloride, ethers such as tetrahydrofuran, esters such as ethyl acetate, methyl acetate and butyl acetate; and mixtures of any of the aforementioned solvents. Chlorinated aliphatic hydrocarbons are preferred, in particular methylene chloride.

Suitable dihydric phenols utilized in the preparation of polycarbonate and copolyestercarbonate include, but are not limited to: BPA; m,p-BPA; BPM; 2,2-bis(3,5-dibromo-4-hydroxyphenyl)propane;2,2-bis(4-hydroxy-3-methylphenyl)propane; 2,2-bis(3,5-dimethyl-4-hydroxyphenyl)propane; 1,1-bis(4-hydroxy-3-methylphenyl)cyclohexane; 1,1-bis(4-hydroxyphenyl)cyclohexane; 1,1-bis(3,5-dimethyl-4-hydroxyphenyl)cyclohexane; 1,1-bis(4-hydroxyphenyl)decane; 1,1-bis(4-hydroxyphenyl)propane; 1,1-bis(4-hydroxyphenyl)cyclodecane; 1,1-bis(3,5-dimethyl-4-hydroxyphenyl)cyclododecane; 4,4'-dihydroxyphenyl ether; 4,4'-dihydroxyphenyl thioether; 4,4'-dihydroxy-3,3'-dichlorophenyl ether; 1,1-bis(4-hydroxyphenyl)-3,3,5-trimethylcyclohexane; 1,1-bis(4-hydroxyphenyl)-1-phenylethane; 1,1-bis(3-methyl-4-hydroxyphenyl)-1-phenylethane, and mixtures thereof. In one embodiment, the structural units of dihydric phenol in the polycarbonate comprise 100 mol % of residues derived from BPA.

Optionally, polyfunctional compounds may be utilized in the preparation of polycarbonate by an interfacial process. Suitable polyfunctional compounds used in the preparation of branched polycarbonate include, but are not limited to, 1,1,1-tris(4-hydroxyphenyl)ethane, 1,3,5-trihydroxybenzene trimellitic anhydride, trimellitic acid, and trimellitic acid chloride.

In preparing a polycarbonate, an endcapping agent may be used. Suitable endcapping agents include monovalent aromatic hydroxy compounds, haloformate derivatives of monovalent aromatic hydroxy compounds, monovalent carboxylic acids, halide derivatives of monovalent carboxylic acids, and mixtures thereof.

Suitable endcapping agents include, but are not limited to phenol, p-tert-butylphenol; p-cumylphenol; undecanoic acid, lauric acid, stearic acid; phenyl chloroformate, 4-t-butylphenyl chloroformate, p-cumyl chloroformate, octylphenyl chloroformate and nonylphenyl chloroformate or a mixture thereof.

If present during the interfacial synthesis, the endcapping agent is preferably present in amounts of about 0.01 to about 0.20 moles, preferably about 0.02 to about 0.15 moles, even more preferably about 0.02 to about 0.10 moles per 1 mole of the dihydric phenol.

The reaction to produce the polycarbonate can be conducted as a batch, semi-batch or a continuous process. Any suitable apparatus can be used for the interfacial polymerization reaction. The material and the structure of the reactor used to prepare the polycarbonate is not particularly limited as long as the reactor has an ordinary capability of stirring.

It is preferable that the reactor is capable of stirring under high viscosity conditions as the viscosity of the reaction mixture increases in later stages of the polymerization reaction.

Typically, the interfacial process for preparing polycarbonate takes several forms. In one, the polymerization is carried out by treatment of a bisphenol with excess phosgene in a stirred vessel in the presence of a base such as sodium hydroxide, a phase transfer catalyst such as triethylamine, water and a solvent such as methylene chloride. The phosgene and sodium hydroxide are fed into the reaction vessel at rates such that the pH of the reaction mixture is basic throughout the reaction. Alternatively, the polymerization reaction may be carried out by exposure of a bischloroformate oligomer, itself prepared by phosgenation of a bisphenol under low pH conditions, to a base such as sodium hydroxide and a phase transfer catalyst such as triethylamine, water and a solvent such as methylene chloride. This latter process is referred to as the bischloroformate process. Typically, the product mixture produced in an interfacial polycarbonate preparation comprises a solution of polycarbonate in an organic solvent wherein the concentration of polycarbonate is between about 5 and about 35% by weight. In one embodiment of the process, the organic solvent is methylene chloride and the polycarbonate is BPA polycarbonates.

Prior to further treatment according to the process of the present invention the product may be purified, although this is not always required. In a typical interfacial polycarbonate preparation, the two phase product mixture comprising an organic phase containing the product polycarbonate and a brine phase are separated by a technique such as decantation and the organic phase is washed successively with dilute acid and pure water to remove phase transfer catalyst, salt and other impurities present in the product mixture. In the case of BPA polycarbonate, for instance, it is preferable that the product mixture contain less than about 1 part per million (ppm) chloride, less than about 100 ppm BPA monomer, and less than about 4 ppm residual phase transfer catalyst. In one aspect of the present invention the product mixture obtained from an interfacial polycarbonate synthesis may be decanted and the polycarbonate containing solution admixed by application of a combined mechanical and hydraulic shear force with a dilute solution of an acid such as hydrochloric acid to form a liquid-liquid dispersion comprising a continuous phase of dilute acid. This liquid-liquid dispersion may then be subjected directly to solvent removal without further water washing steps. The polymer isolated contains levels of chloride and residual phase transfer catalyst which are comparable to those obtained using known isolation techniques which employ acid and multiple water washes following the brine separation step.

In the first step of the process of the instant invention the solvent-polymer product mixture obtained from an interfacial polycarbonate synthesis, for instance, is admixed with water or, in the alternative, an aqueous fluid. Where an aqueous fluid is admixed with the product mixture from an interfacial polycarbonate synthesis, said aqueous fluid preferably comprises from about 50 to about 99% by weight water, preferably about 90 to about 99% by weight water, even more preferably about 95 to about 99% by weight of water. By "admixing" it is meant that the water or, in the alternative, the aqueous fluid, and the product mixture are brought into contact under a shear force, in particular a combined mechanical and hydraulic shear force. This process may be referred to as homogenization.

The resultant admixture is a two phase mixture, referred to as a liquid-liquid dispersion, having an aqueous phase and an organic phase. The ratio of water to organic solvent, by volume, in the admixture is in the range of about 20:1 to about 0.8:1, preferably 5:1, even more preferably 1:1. It has been found that an effort should be made to avoid any contact between water and organic solution before the shear force is applied to the mixture, to avoid the potential nonuniformity of the droplets.

In the present invention, the shearing force is sufficient to form a liquid-liquid dispersion. The dispersed phase comprises droplets of the organic solvent, containing the dissolved polymer. The continuous phase comprises the aqueous fluid. The process of the present invention does not require emulsifying agents, however emulsifying agents may be added. The addition of an emulsifying agent may necessitate further purification steps to effect its later removal, however.

The means of applying the combined mechanical and hydraulic shear force, for example a rotor-stator in-line mixer, is preferably operated at a shear rate such that the droplets of the liquid-liquid are from about 1 to about 300 microns, preferably from about 1 to about 100 microns, even more preferably from about 1 to about 50 microns in diameter.

The combined mechanical and hydraulic shear force may be applied by means, including, but not limited to, rotor-stator shear mixers, both single or multistage; low profile rotor-stator shear mixers; colloid mills; and high pressure homogenizers. In some instances it may be desirable to use more than one means of applying the mechanical and hydraulic shear force necessary to create the liquid-liquid dispersion. In such a case the one means of applying the mechanical and hydraulic shear force may be arranged in series, for example, as when the liquid-liquid dispersion is prepared by passage of the organic mixture and aqueous fluid through two or more rotor stator shear mixers operating in series. The shear force applied is a combination of mechanical shear force and hydraulic shear force. In one embodiment, a rotor-stator in-line mixer is used to apply shear force to effect conversion of the mixture of water and polymer solution into the liquid-liquid dispersion. One example of a suitable rotor-stator shear mixer is a single stage rotor-stator shear mixer, Model 150L, manufactured by SILVERSON MACHINES of East Longmeadow, Mass. One example of a suitable rotor-stator shear mixer is a two stage rotor-stator shear mixer, Model 152-50 also manufactured by SILVERSON MACHINES of East Longmeadow, Mass. Suitable shear rates in the mixer are from about $4 \times 10^3$/second to about $7 \times 10^5$/second; more preferably about $4 \times 10^4$/second to about $3 \times 10^5$/second. Where a multistage rotor stator shear mixer is employed suitable hear rates are from about $4 \times 10^3$/second to about $7 \times 10^5$/second at each stage.

As mentioned, to provide better control of the formation of the polymer-containing droplets dispersed in a continuous aqueous phase, it is preferable that the aqueous fluid stream and the product mixture stream do not make contact before they are subject to a shear force, for example, before the water and organic streams reach the center of a stator in a rotor-stator mixer. In one embodiment of the present invention, this is achieved by introducing both streams directly a rotor-stator mixer using an annulus. The water and polymer solution are kept apart thereby until they are intimately mixed by the applied force. By "intimately mixed" it is meant that the mixture water and polymer solution is subjected to sufficient mechanical shear and hydraulic shear force to produce a dispersed phase, which is finely divided and homogeneously dispersed in the continuous phase.

The liquid-liquid dispersion having the aforementioned characteristics provides better solvent-polymer separation characteristics than known high shear isolation methods. Removal of the solvent from a droplet results in the formation of an isolable polymer particle. The droplets with smaller diameter achieved by the method of the present invention have higher surface to volume ratios than larger droplets, therefore the transfer of heat into and the transfer the solvent out of the droplets can proceed at a faster rate than that observed for larger droplets. This in turn reduces the agitation tank residence time required to effect conversion of a droplets into an isolable polymer particles and reduces the likelihood of agglomeration.

Conversion of the liquid-liquid dispersion to a slurry of polymer in water requires means for removal of the organic solvent from the liquid-liquid dispersion. The organic solvent may be removed by various means, including, for example, introduction of the liquid-liquid dispersion into a vessel filled with water the temperature of which is higher than the boiling point of the organic solvent present in the liquid-liquid dispersion. During this stage, it is preferable to provide agitation sufficient to promote heat transfer for the organic solvent's removal. It is preferable that at least about 80% by weight, more preferably 95% by weight, of the organic solvent be removed in this step thereby producing a solid particle of the polymer. The organic solvent in the remaining solid is preferably no more than from about 0.5 to about 10%, by weight of the polymer. The organic solvent removed from the system may be recovered and recycled into the same or other uses. For example, the organic solvent may be recycled back to an interfacial polycarbonate synthesis. The residual solvent in the polymer may be removed by known techniques, such as steam stripping. Where the organic solvent is removed by evaporation or sparging with a gas such as nitrogen or steam, the organic solvent may be recovered by condensation of the solvent. Where the organic solvent is removed by passage of water through the agitation tank, the organic solvent may be recovered from the solvent laden water exiting the agitation tank.

The removal of the organic solvent from the liquid-liquid dispersion is, in one aspect of the invention, effected by introducing the liquid-liquid dispersion into an agitation tank filled with water at a temperature above the boiling point of the organic solvent for a time sufficient to evaporate the organic solvent. The agitation tank may be adapted for operation at subatmospheric pressures whereby the boiling point of the solvent is reduced. The agitation tank may likewise be adapted such that one or more gases such as nitrogen or steam may be introduced as a means of mixing, providing temperature control or physical entrainment of solvent out of the agitation vessel. The agitation tank may be adapted such that solvent free water is continuously introduced into the agitation tank while a corresponding amount of water is continuously removed. Where the solvent, such as methylene chloride, has an appreciable solubility in water, such treatment may be used for the continuous removal of solvent in the water exiting the agitation tank. The aqueous stream exiting the agitation tank may then be subjected to a solvent separation step such as heating to boil off solvent which is then recovered. The water may then be redirected to the agitation tank such that the continuous introduction of water operates with a fixed volume of water.

The agitation tank is fitted with an impeller to stir the mixture. The present process further has the advantage that the agitation speed during the solvent removal step is substantially reduced compared to known processes, thereby requiring less energy expenditure. A feed stream containing the liquid-liquid dispersion is preferably introduced into the agitation tank at the bottom of the tank, with care taken such that the liquid-liquid dispersion is introduced in a mixing zone. The type of impeller used in the agitation tank may affect the characteristics of the product polymer. It is preferable to use axial flow impellers. In one embodiment of the present invention, a 45 degree pitched blade impeller is used. Other suitable impellers include, but are not limited to low shear hydrofoils and propellers.

The mechanical energy input through agitation into the vessel, for example the agitation tank, should be maintained such that enough turbulence is supplied to facilitate solvent removal and such that undesirable agglomeration of the particles is avoided. Typically, from 0.5 kilowatts per cubic meter ($m^3$) to about 4 kilowatts per $m^3$, more preferably about 2 kilowatts per $m^3$ produces product having the desired characteristics.

In the process of the instant invention an antisolvent such as methanol, ethanol, propanol, isopropanol, acetone, methyl ethyl ketone, acetonitrile or a mixture thereof may be added to the along with water to the agitation tank to aid in polymer particle formation. When an antisolvent is employed in this manner it is preferred that the that the volume ratio of water to antisolvent in the agitation tank be in a range between about 75:25 and about 99:1 water:antisolvent respectively. A volume ratio of water to antisolvent in a range between about 90:10 and about 99:1 is even more preferred and a range between about 95:1 and about 99:1 water:antisolvent respectively is still more preferred.

In the process of the instant invention a small amount of the polymer to be isolated may optionally be added to the agitation tank to aid the formation of polymer particles. For example, a small amount of polycarbonate powder may be added to aid the recovery of polycarbonate from a liquid-liquid dispersion containing dissolved polycarbonate. The added solid polymer particles are referred to as "seed" particles and act to promote the formation of polymer particles. Typically from about 0.01 to about 25% by weight, more preferably about 1% by weight, based on the total weight of the fluid in the agitation tank may be added. In one embodiment of the present invention, the seed particles range in size from about 1 to about 100 microns.

Removal of the organic solvent from the liquid-liquid dispersion results in the conversion of the droplets into solid polymer particles dispersed in an aqueous phase, herein referred to as a "slurry". The polymer particles formed, typically have a size between 100 microns and 5 millimeters. The particles are typically agglomerations of smaller particles having an average size of from about 1 micron to about 100 microns, the smaller particles having glassy or porous textures. By "glassy textures" it is meant that the particles have few pores in the bulk and appear to have a smooth texture. The polymer particles are preferably removed by overflow of the slurry from the top or side of the agitation tank. The polymer particles preferably represent up to about 25% by weight of the slurry. Recovery of the polymer from the slurry may be carried out by known solid-liquid separation processes, including, but not limited to, centrifugation, filtration, and decantation. As mentioned, the recovered polymer, such as polycarbonate, may be subjected to further purification techniques to remove residual solvent, for example steam stripping.

In the process of the present invention suitable operating conditions in the solvent removal step may depend upon the structure and physical properties of the polymer being isolated. Thus, conditions suitable for the isolation of a polycarbonate having a weight average molecular weight of about 30,000 daltons and a glass transition temperature of about 138° C. may be different from those found suitable for the isolation of a polycarbonate having a higher molecular weight and glass transition temperature. Generally suitable temperatures for solvent removal are in the range from about 5 to about 99° C.; more preferably about 20 to about 85° C. The operating pressure in may be varied in a range from about 0.01 to about 2 atmospheres. The solvent removal step is preferably carried out in a range between about 0.25 and about 1 atmospheres. A variety of other factors may also play a role in determining the best operating conditions. These include the size and shape of the agitation tank, the choice of agitation tank contents, the characteristics of liquid-liquid dispersion including the identity of the solvent or solvents used and the size of the polymer-containing droplets, the rate at which the liquid-liquid dispersion is introduced into the agitation tank; the impeller size, shape and speed, whether or not an inert gas, steam or additional water is introduced into the agitation tank during solvent removal, and the presence or absence of "seed" particles in the agitation tank.

The temperature at which the solvent removal step is carried out is preferably lower than the boiling point of the initial contents of the agitation tank and higher than the boiling point of the organic solvent comprising the liquid-liquid dispersion. The initial contents of the agitation tank may consist of water or a solution of an additive, such as an alcohol, in water.

The texture of the polymer particles isolated may be manipulated by adjusting the differences between the boiling point of the organic solvent and the temperature at which the solvent removal step is carried out. In particular, the smaller the difference between the boiling point of the organic solvent and the temperature at which the solvent removal step is carried out, the higher the bulk density of the product polymer. In the isolation from methylene chloride solution of a polycarbonate having a weight average molecular weight of about 30,000 daltons and a glass transition temperature of about 138° C., the bulk density of the polycarbonate powder was about 0.5 grams/cm$^3$ where the said temperature difference was about 7 degrees Celsius. Conversely, isolation of polycarbonate from an identical solution of polycarbonate in methylene chloride afforded a product having a bulk density of about 0.3 grams/cm$^3$ where the said temperature difference was about 28 degrees Celsius.

In a further embodiment of the present invention, the step of removing the organic solvent from the liquid-liquid dispersion thereby forming a polymer slurry, may be effected by means of an extruder. In this embodiment of the invention, the liquid-liquid dispersion formed upon admixture of the polymer solution with water or, in the alternative, an aqueous fluid is fed into an extruder at least some of the zones of which are operated at temperatures exceeding the boiling point of the organic solvent, but less than the boiling point of water, under the conditions prevailing within that zone of the extruder. At least some of these zones are vented to permit removal of the organic solvent. The vented zones may be operated at atmospheric, supraatomospheric or subatmospheric pressures. The extruder may be configured to permit the addition of water or other aqueous fluid at any point along the extruder. In some instances it may be useful to introduce water, in addition to that present in the liquid-liquid dispersion, in order to facilitate solvent removal and polymer slurry formation. The slurry is collected at the die face of the extruder and the polymer separated using standard means such as filtration, centrifugation and the like.

The process of the present invention may be applied to a wide variety of polymers having different molecular structures and molecular weights. Where the polymer to be isolated is BPA polycarbonate, the number average molecular weight of the product polycarbonate is in the range of about 1000 to about 60,000 daltons. The particles produced by the present process produce a high degree of spherical particle agglomeration.

The process of the invention may be operated in a semi-batch or a continuous manner.

Figure 1:
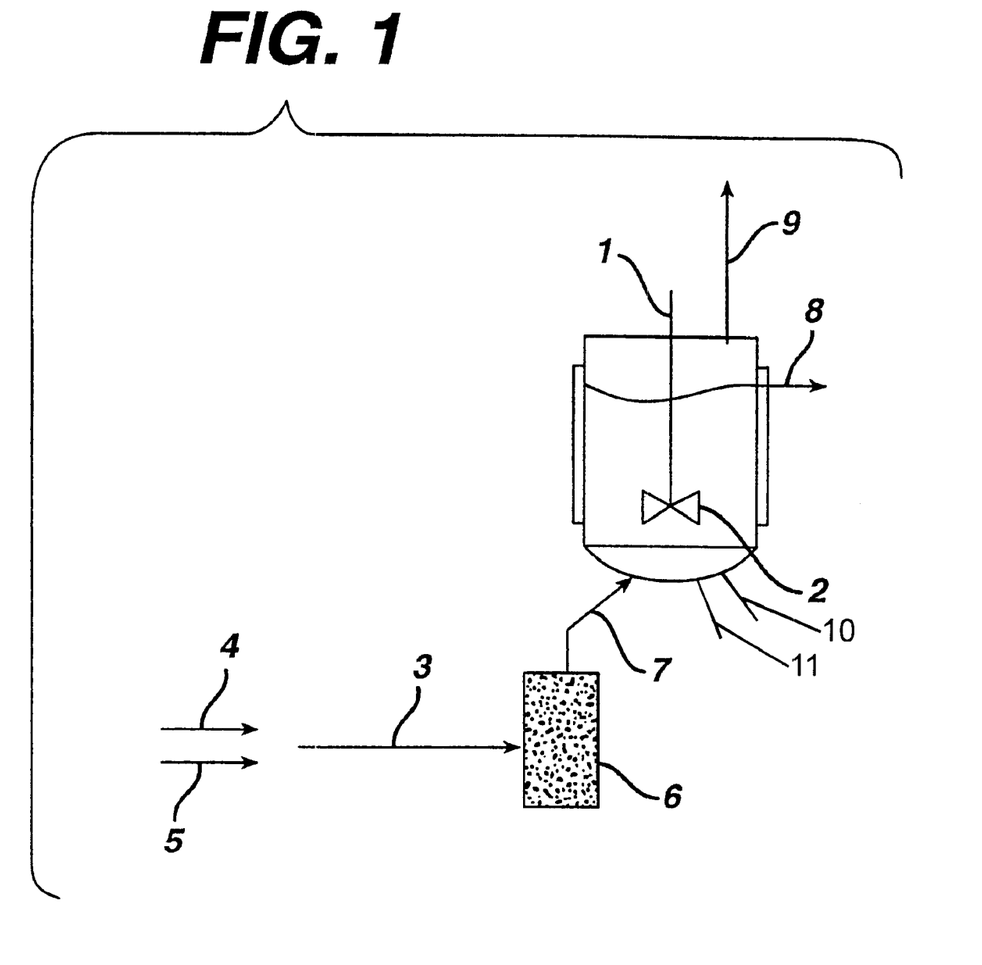
FIG. 1 sets forth a diagram of one embodiment of the process.

FIG. 1 sets forth one embodiment of the invention. In FIG. 1, a jacketed agitation tank 1 equipped for operation at atmospheric, subatmospheric or supraatmospheric pressures is fitted with an impeller 2. An annulus 3 is provided, wherein an aqueous stream 4 and a polycarbonate solution stream 5 are simultaneously introduced into a rotor-stator shear mixer 6. The solution stream and the aqueous stream are mixed at the center of the shear mixer where the applied shear produces a liquid-liquid dispersion having the aqueous phase as the continuous phase. The emulsion is sent to the agitation tank through line 7. The agitation tank 1 may be heated by the introduction of steam directly into the tank via line 11 or by passage of steam, water or other heated fluid through the jacket of the agitation tank. Solvent evaporation, generates a slurry stream 8 containing polycarbonate particles. The slurry stream 8 containing the polycarbonate particles is overflowed from the top of the agitation tank. Solvent vapor is released from the top of the agitation tank 1 through line 9. Lines 10 and 11 provide for the introduction of an inert gas, and steam or water respectively.

EXAMPLES

The following examples are set forth to provide those of ordinary skill in the art with a detailed description of how the methods claimed herein are made and evaluated, and are not intended to limit the scope of what the inventors regard as their invention. Unless indicated otherwise, parts are by weight, temperature is in °C.

Molecular weights are reported as number average ($M_n$) or weight average ($M_w$) molecular weight and were determined by GPC analysis, using polystyrene standards to construct a calibration curve against which polymer molecular weights were determined. The temperature of the columns was about 25° C. and the mobile phase was chloroform.

Examples 1 through 8

The equipment set-up for Examples 1 through 8 is set forth in FIG. 1. Examples 1 through 8 were performed as semi-batch processes. The polymer solution used was that obtained in an interfacial polycarbonate synthesis using methylene chloride solvent and contained 25% by weight dissolved polycarbonate. The polymer itself was BPA polycarbonate having a weight average molecular weight of about 30,000 daltons and a glass transition temperature of about 138° C. To control the size and uniformity of the solution droplets in the liquid-liquid dispersion, the stream of polycarbonate in methylene chloride and water stream were not contacted prior to reaching the center of the stator in the mixer. This was achieved by introducing both streams via an annulus into the mixing zone of a rotor-stator shear mixer. The annulus served to isolate the solution stream and the water stream until introduced. The rotor-stator shear mixer used was a Model 150L from Silverson Machines, Inc. The agitation tank used had an effective volume of 5.5 L with an inside diameter of 5.5 inch. The tank was jacketed and hot water was circulated to provide the heat for solvent evaporation. The tank was operated at atmospheric pressure. The solution was introduced close to the bottom of the agitation tank in a near the impeller.

The agitation tank was partially filled with water and 1 gram of BPA polycarbonate powder was added to the agitation tank as "seed". The tank was stirred at 800 rpm with a 3 inch 45° pitched-blade impeller. After the contents of the agitation tank reached the desired operating temperature the water and product solution stream were pumped through the rotor-stator mixer to produce a liquid-liquid dispersion which was introduced into the agitation tank for a period of 20 minutes. The introduction of the liquid-liquid dispersion was then stopped and the contents of agitation tank were stirred for a period of about 15 minutes at a temperature of between held at a temperature of between about 47 to and about 60° C.

Next, the agitator was stopped and the slurry in the agitation tank was transferred onto a vacuum filter to separate the solid polycarbonate. Samples of the product granules were taken to measure the water and dichloromethane content. The remaining product was ground in a fitz mill and the powder obtained was dried under house vacuum for 2 days at about 80° C., after which the bulk density of the polycarbonate was measured.

Example 9

The equipment set up and polymer solution used were the same as that in Examples 1–8. However, Example 9 was operated as a continuous process. At the beginning of the experiment, the agitation tank was filled with water. One gram of BPA polycarbonate powder was added as "seed" and the water temperature of the tank was raised to 47° C. The initial solution flow rate through the rotor-stator mixer was 20 mL/minute. The volumetric ratio of the water phase to the organic phase fed to the agitation tank via the rotor-stator mixer was 15. The rotor-stator mixer was operated at 1700 rpm. Agitation tank stirring was effected as in Examples 1–8. After 10 minutes, the solution flow rate was increased to 40 mL/minute, and the rate of water fed to rotor-stator mixer was adjusted to give a volumetric ratio of water phase to organic phase of 5. The run lasted for 1 hour and 40 minutes. Resin particles were collected as slurry overflow from the top of the agitation tank. The solid content in the slurry was found to be 25%.

Example 10

The equipment set up, polymer solution, procedures and initial operating conditions were identical to those described in Example 9. After 10 minutes, the solution flow rate was increased to 40 mL/minute, and the water feed rate was adjusted to give volumetric ratio between the water phase and the organic phase of 5. After an additional, 10 minutes the solution flow rate was increased to 60 mL/minute and the water feed rate was adjusted to give volumetric ratio between the water phase and the organic phase of 1. The run lasted for 1 hour and 10 minutes. Resin particles were collected as slurry overflow from the top of the agitation tank. During the run the rotation of the impeller was maintained at 600 rpm. The water in the slurry was removed on a centrifuge. The water content in the resultant polycarbonate was 10% of the total weight.

"Speed of RS" is the speed of the rotor-stator mixer in rotations per minute (rpm).

"Temp (°C.)" is the temperature of the contents of the agitation tank.

"W/O Ratio" is the volumetric ratio of the water phase to the organic phase.

"Flow rate" is the flow rate of the organic solution through the rotor-stator mixer.

"$H_2O$ content" is the weight fraction of water based on the weight of the slurry.

"$MeCl_2$ content" is the weight fraction of methylene chloride in the product granules, based on the total weight of the granules.

Examples 1–10 illustrate the successful practice of the method of the present invention in both semi-batch and continuous modes at atmospheric pressure.

TABLE I

| Example | Speed of RS | Temp (° C.) | W/O Ratio | Flow rate (mL/min) | Bulk density (g/mL) | $H_2O$ Content | $MeCl_2$ Content |
| --- | --- | --- | --- | --- | --- | --- | --- |
| 1 | 7700 | 47 | 15 | 20 | 0.341 | 0.423 | 0.0460 |
| 2 | 1700 | 52 | 5 | 20 | 0.309 | 0.465 | 0.0510 |
| 3 | 1700 | 52 | 15 | 10 | 0.135 | 0.674 | 0.0295 |
| 4 | 1700 | 47 | 5 | 10 | 0.214 | 0.487 | 0.0221 |
| 5 | 3400 | 52 | 5 | 10 | 0.092 | 0.696 | 0.0552 |
| 6 | 3400 | 47 | 15 | 10 | 0.236 | 0.497 | 0.0408 |
| 7 | 3400 | 52 | 15 | 20 | 0.291 | 0.338 | 0.0238 |
| 8 | 3400 | 47 | 5 | 20 | 0.424 | 0.288 | 0.0568 |
| 9 | 1700 | 47 | 5 | 40 | 0.447 | 0.251 | unavailable |
| 10 | 1700 | 47 | 1 | 60 | 0.491 | 0.264 | 0.0238 |

The polycarbonate was further subjected to steam stripping at a temperature of 106° C. After 80 minutes, the methylene chloride content was less than 25 ppm. The stripping test was performed as follows: The ground powder obtained in each of Examples 3 and 6 was charged to a glass column and configured as a fixed bed. Stream (5 psig) was passed through the bed for 80 minutes. The solvent level in the powder was then measured.

Examples 11–19

In Examples 11–19 the polymer was BPA-dodecandioic acid copolyestercarbonate (Lexan SP®) having a weight average molecular weight of about 30,000 daltons and a glass transition temperature of about 125° C. A solution in methylene chloride was obtained from interfacial polycarbonate synthesis and contained about 34% by weight of dissolved polyestercarbonate. This was diluted as required for individual experiments. The equipment setup and procedure were the same as that used in Examples 1–8 with the exception that the agitation tank was equipped for operation at subambient pressure and additionally, the agitation tank was adapted for the introduction of live steam to provide additional heat for the evaporation. The liquid-liquid dispersion was introduced close to the bottom of the agitation tank, the high mixing zone. The volumetric ratio of solution phase to water phase was 1. Each run started with the agitation tank partially full of water such that the agitation tank could accommodate both its initial contents and the liquid-liquid dispersion added over the course of the run without overflow. The agitation tank was charged initially with water containing 5% by weight polycarbonate powder as "seeds" for particle formation. The product polymer was isolated as described for Examples 1–8. The column heading "PC conc. (%)" refers to the concentration of polycarbonate in the polymer solution employed.

Example 20

This example illustrates the continuous isolation of the same polymer used in Examples 11–19 above. The equipment used was the same as that used in the Examples 11–19 with the following modifications: Two 45°-pitched-blade 3-inch-diameter impellers were used to stir the agitation tank. The temperature of the agitation tank was about 80° C. The solution of copolyestercarbonate fed to shear mixer was 33% by weight polymer. The solution was heated under slight pressure to a temperature of 45° C. before its introduction to the shear mixer. An air blower was installed in the exit of the tank overflow, that helped to remove particles continuously out of the tank. Live steam was injected from the bottom of the tank to maintain an internal temperature of about 80° C. The isolation proceeded at flow rate of the polycarbonate solution of about 40 mL/min over a seven and a half hour period. The volumetric ratio of water phase and organic phase was maintained at about 1.5. The solid content in the agitation tank was maintained at about 8.5%. The particles obtained had a very uniform size distribution with an average diameter between 0.5 to 5 mm.

The data in Table II identify conditions suitable for the isolation of a particular copolyestercarbonate in both low temperature-subatmospheric pressure (Examples 12–19) and higher temperature atmospheric pressure regimes (Example 20). The lower Tg copolyestercarbonate used in Examples 11–20 could not, however, be isolated under conditions of Example 11. Simple adjustment of agitation tank parameters such as the operating temperature and pressure (Examples 12–14), or shear rate in combination with adjustment of the agitation tank temperature and pressure (Example 15, 16 and 20) resulted in the successful isolation of the polymer, however. Examples 17–19 illustrate: (Example 17) additional variations in which a nonsolvent (methanol) is added to the agitation tank, (Example 18) the use of a nitrogen sweep at liters/min introduced from the bottom of the agitation tank, and (Example 19) the passage of a stream of water through the agitation tank at 600–800 mL per minute. Examples 18 and 19 represent conditions which permitted the highest production rate attained for this particular polymer. In each case, cessation of either the nitrogen sweep or passage of the stream of water through the agitation tank resulted in agglomeration of the product polymer in the agitation tank at a flow rate of 40 mL per minute.

TABLE 11

ISOLATION OF BPA-DODECANDIOIC ACID COPOLYESTER-CARBONATE

| Example | Temp (° C.) | Pressure (mmHg) | Speed of RS | PC conc. (%) | Max. Flow Rate (mL/minute) | Production rate (Kg/L/hr) |
|---|---|---|---|---|---|---|
| 11[a] | 47 | 760 | 3400 | 30 | 0 | 0 |
| 12 | 30 | 400 | 3400 | 30 | 20 | 0.074 |
| 13 | 20 | 260 | 3400 | 30 | 20 | 0.074 |
| 14 | 20 | 260 | 3400 | 34 | 24 | 0.101 |
| 15 | 20 | 260 | 5200 | 34 | 30 | 0.126 |
| 16 | 20 | 600 | 5200 | 34 | 30 | 0.126 |
| 17[b] | 20 | 600 | 5200 | 34 | 30 | 0.126 |
| 18[c] | 20 | 600 | 5200 | 28 | 40 | 0.138 |
| 19[d] | 20 | 600 | 5200 | 28 | 40 | 0.138 |
| 20 | 80 | 760 | 5200 | 34 | 30 | 0.126 |

[a]Run failed. No maximum flow rate achievable
[b]Agitation tank was charged with 5% by volume methanol at start of run
[c]Agitation tank swept with nitrogen gas
[d]Water continuously introduced into and removed from agitation tank Examples 21–32

In Examples 21 through 32 the polymer solution used had a polymer concentration of 25 weight percent polymer in methylene chloride. The polymer solution was obtained interfacial polycarbonate synthesis using methylene chloride. The polymer itself was BPA polycarbonate having a weight average molecular weight of about 50,000 daltons and a glass transition temperature of about 145° C. The experiment set-up was essentially the same as that in Example 20.

In Examples 21–28 the following isolation parameters were used: The flow rate of polycarbonate solution was about 20 mL/min. The shear mixer rotation speed was 4600 rpm. The agitation tank impeller speed was 900 rpm. The W/O value was 2. Isolation was carried out at atmospheric pressure. Table III illustrates the robustness of the present invention. Examples 21–28, while illustrating the sensitivity of a given polymer to a given set of isolation conditions, reveal that such sensitivity is easily overcome through straightforward experimentation. Isolation was successful at an agitation tank temperature in a range from about 60 to about 70° C. at atmospheric pressure in the absence of a nitrogen sweep or additional water flow.

TABLE III

| Example | Temp (° C.) | Notes |
|---|---|---|
| 21 | 45 | Powder sticky, run failed. |
| 22 | 50 | Powder sticky, run failed. |
| 23 | 55 | Powder sticky, run failed. |
| 24 | 60 | Isolated free flowing polymer powder. |
| 25 | 65 | Isolated free flowing polymer powder. |
| 26 | 70 | Isolated free flowing polymer powder. |
| 27 | 75 | Isolated material strained, and entangled together. Agitation inefficient, run failed. |
| 28 | 85 | Isolated material strained, and entangled together. Agitation inefficient, run failed. |

Examples 29–32 of Table IV demonstrate the importance of shear mixer speed. The isolation conditions were as follows: The isolation temperature was 65° C., the impeller diameter was 5 inches, the agitation tank impeller speed was 600 rpm, the agitation tank was operated at atmospheric pressure, the concentration of the polycarbonate solution was 21%, the W/O value was 1.5, live steam was introduced at the bottom of the tank to provide the heat to evaporate the solvent. The diameter of the tank was 8 inches. The reactor volume was 4.5 liter (L). As in all continuous runs the agitation tank was filled with water and brought to temperature prior to the introduction of the liquid-liquid dispersion.

TABLE IV

| Example | Max. solution flow rate (mL/min) | Speed of RS[a] | Isolation rate (Kg/L/hr) |
|---|---|---|---|
| 29 | 23 | 900 | 0.080 |
| 30 | 41 | 1800 | 0.146 |
| 31 | 40 | 2700 | 0.146 |
| 32 | 40 | 3600 | 0.139 |

[a]Two stage rotor stator shear mixer employed.

Examples 33 and 34 illustrate the use of an extruder to effect step (b) of the present invention.

Example 33

Water (100 mL/min) and a 33% by weight solution of Lexan-SP® copolyestercarbonate in methylene chloride (100 mL/min) were fed through an annalus into the mixing zone of a single stage rotor stator shear mixer operated at 5200 rpm. The resultant liquid-liquid dispersion was fed directly into a 10 barrel, 30 mm extruder. The extruder was provided with three vent zones for solvent removal and was operated at 120 rpm. The temperature gradient along the length of the extruder was in a ranged between about 50 and about 80° C. The product exiting the die face of the extruder was a slurry of copolyestercarbonate in water, the polymer particles having a solvent content of less that 20% by weight methylene chloride.

Example 34

BPA polycarbonate was isolated using the method described in example 33 above. The polymer solution used was that obtained in an interfacial polycarbonate synthesis using methylene chloride solvent and contained 25% by weight dissolved polycarbonate. The polymer itself was BPA polycarbonate having a weight average molecular weight of about 30,000 daltons and a glass transition temperature about 138° C.

Examples 35–36

In Example 35 and 36 a two phase mixture comprising a solution of polycarbonate in methylene chloride and brine was obtained via interfacial polymerization using triethylamine as a phase transfer catalyst. The methylene chloride solution containing the polycarbonate had a concentration of 22% by weight. The polycarbonate itself was BPA polycarbonate and had a weight average molecular weight ($M_w$) of about 30000. The mixture was decanted to separate the brine solution. The organic phase was collected and the triethylamine TEA level was measured and found to be 909 parts per million (ppm). The organic phase and an aqueous solution of hydrochloric acid (HCl) having a pH of 2 were fed through an annulus to the mixing zone of a two stage rotor stator shear mixer operated at 2700 rpm. The liquid-liquid dispersion produced was fed to an agitation tank containing approximately 5 liters of water which had been heated to 65° C. The agitation tank was equipped with a 5 inch impeller and was operated at an agitation speed of 600 rpm. Feed rates and analytical results are given in Table V. The particles were isolated and ground before being washed with water. The powder was dried and the concentrations of chloride ion, [Cl⁻], and triethylamine in the polymer were measured using standard titration and standard UV-Visible spectroscopic techniques respectively. The data illustrate that the observed levels of residual chloride and triethylamine can be achieved without recourse to the commonly employed dilute acid and water washing treatment steps which follow brine separation as a purification step prior to polymer isolation.

TABLE V

| Example | W/O Ratio | Polycarbonate Solution Flow Rate | [Cl⁻][a] | [TEA][b] |
|---|---|---|---|---|
| 35 | 2 | 10 mL/min | 6 ppm | 5 ppm |
| 36 | 2 | 20 mL/min | 6 ppm | 8 ppm |

[a]Residual chloride level in isolated polycarbonate.
[b]Residual triethylamine level in isolated polycarbonate The invention has been described in detail with particular reference to preferred embodiments thereof, but it will be understood that variations and modification can be effected within the scope of the invention.

What is claimed is:

1. A method of recovering polymer from an organic mixture comprising a polymer is selected from the group consisting of polyestercarbonates, polystyrene, polyethylene ethers, polyphenylene ethers, polyetherimides, polysulfones, polyamides and polyesters and an organic solvent, the method consisting of:
   (a) admixing an aqueous fluid and the organic mixture by application of a combined mechanical and hydraulic shear force, the combined mechanical and hydraulic shear force being sufficient to form a liquid-liquid dispersion;
   (b) removing the organic solvent from the liquid-liquid dispersion thereby forming an aqueous slurry of polymer particles; and
   (c) separating the polymer from the aqueous slurry.

2. The method of claim 1, wherein step b) comprises evaporating the organic solvent from the liquid-liquid dispersion.

3. A method according to claim 1 wherein the organic solvent is removed at a pressure of between 0.01 and 2 atmospheres.

4. The method of claim 1, wherein the ratio of the aqueous fluid to the organic mixture is from 15:1 to 1:1 by volume.

5. The method of claim 4, wherein the organic solvent is methylene chloride.

6. The method of claim 2, wherein the liquid-liquid dispersion comprises droplets having diameters up to about 200 microns.

7. The method of claim 6, wherein the liquid-liquid dispersion comprises droplets having diameters up, to about 50 microns.

8. The method of claim 7, wherein the shear force is effected by at least one rotor-stator mixer operating at a shear rate of from about $4 \times 10^3$/second to about $7 \times 10^5$/second.

9. A method according to claim 1, wherein the polyestercarbonate contains structural units derived from each of bisphenol A and dodecandioic acid.

10. A method according to claim 9, wherein the structural units derived from dodecandioic acid are present in amount up to 15 weight percent of the total weight of the polyestercarbonate.

11. A method of recovering a polymer selected from the group consisting of polyestercarbonates, polystyrene, polyethylene ethers, polyphenylene ethers, polyetherimides, polysulfones, polyamides and polyesters polycarbonate from an organic mixture comprising a polymer solution in and methylene chloride, the organic mixture the method consisting of:

(a) admixing water and the organic mixture by the application of a combined mechanical and hydraulic shear force, the combined mechanical and hydraulic shear force being sufficient to form a liquid-liquid dispersion, the liquid-liquid, liquid dispersion comprising droplets having a diameter of from about 1 to about 300 microns;

(b) removing the methylene chloride from the liquid-liquid dispersion thereby forming a slurry comprising solid polymer particles; and (c) separating the polymer from the slurry.

12. The method of claim 11, wherein the diameter of the droplets is from about 1 micron to about 50 microns.

13. The method of claim 11, wherein the combined mechanical and hydraulic shear force is effected by at least one rotor-stator mixer operating at a shear rate of from about $4 \times 10^3$/second to about $7 \times 10^5$/second.

14. The method of claim 11, wherein the step of removing the methylene chloride comprises introducing the liquid-liquid dispersion into an agitation tank filled with water, wherein the temperature of the water is higher than the boiling point of methylene chloride.

15. The method of claim 14, wherein step (b) is carried out at a pressure of between about 0.01 and about 2 atmospheres.

16. The method of claim 15, wherein step (b) further includes at least one of the following:

(i) sweeping with an inert gas;

(ii) introducing steam; and (iii) continuous introduction and removal of water.

* * * * *